(12) United States Patent
Cho et al.

(10) Patent No.: US 7,095,548 B1
(45) Date of Patent: Aug. 22, 2006

(54) MICROMIRROR ARRAY LENS WITH FREE SURFACE

(75) Inventors: Gyoung Il Cho, Seoul (KR); Cheong Soo Seo, Seongnam (KR)

(73) Assignees: Angstrom Inc., Suwon (KR); Stereo Display Inc., Anaheim, CA (US)

( * ) Notice: Subject to any disclaimer, the term of this patent is extended or adjusted under 35 U.S.C. 154(b) by 0 days.

(21) Appl. No.: 11/191,886

(22) Filed: Jul. 28, 2005

(51) Int. Cl.
*G02B 26/08* (2006.01)
(52) U.S. Cl. .................. 359/298; 359/290; 359/291
(58) Field of Classification Search ............ 359/291, 359/290, 223, 224, 318, 871, 872; 345/108
See application file for complete search history.

(56) References Cited

U.S. PATENT DOCUMENTS

| | | | | |
|---|---|---|---|---|
| 2,002,376 | A * | 5/1935 | Mannheimer | 40/582 |
| 2002/0102102 | A1 * | 8/2002 | Watanabe et al. | 396/89 |
| 2004/0252958 | A1 * | 12/2004 | Abu-Ageel | 385/133 |
| 2005/0174625 | A1 * | 8/2005 | Huibers | 359/291 |

OTHER PUBLICATIONS

James G. Boyd, Fast response Variable Focusing Micromirror Array Lens; SPIE vol. 5055(2003).*

* cited by examiner

*Primary Examiner*—Timothy Thompson
(74) *Attorney, Agent, or Firm*—John K. Park; Park Law Firm (57) ABSTRACT

A micromirror array lens includes a plurality of micromirrors, and reproduces a predetermined free surface by controlling rotation and/or translation of the micromirrors. The micromirror is controlled by control circuitry, upheld by a mechanical structure, and includes a reflective surface. The predetermined free surface of the lens is changed by controlling rotation and/or translation of the micromirrors. The micromirrors are arranged in one or more concentric circles to form the lens. The micromirror has a fan shape, a hexagonal shape, a rectangular shape, a square shape, or a triangle shape. The reflective surface of the micromirror is substantially flat. The control circuitry is constructed under the micromirrors by using semiconductor microelectronics technologies. The micromirrors are actuated by electrostatic and/or electromagnetic force. The reflective surface of the micromirror is made of materials with high reflectivity. The lens is used for an imaging apparatus, video monitoring camera, a camcorder, etc.

101 Claims, 7 Drawing Sheets

MICROMIRROR ARRAY LENS WITH FREE SURFACE

BACKGROUND OF THE INVENTION

The present invention relates to a micromirror array lens with free surface. More particularly, this invention relates to a micromirror array lens with free surface that enables high performance with compactness.

Spherical lens cannot converge parallel rays into one point. Therefore, many lenses are combined to correct it. In those cases, since many lenses are assembled, there is limitation in achieving high performance of a large-aperture lens with compactness.

On the other hand, if an aspherical lens with desired free surface which can gather rays at one point is used, it can converge parallel rays into one point with a single lens. It can reduce volume and weight of optical system. High optical performance is also possible.

For this reason, an aspherical lens has been used for beam projector, projection TV, CD-ROM pickup, DVD player, laser printer, laser scanning unit, etc.

But, it is difficult to make an aspherical lens with actually required complicated aspheric surface of accuracy less than 0.1 µm with existing machine performance. In addition, it is difficult to measure the misbehavior of the lens produced with less than 0.1 µm accuracy. On the other hand, micromirror array lens with free surface can form aspherical lens with accuracy less than 0.1 µm.

SUMMARY OF THE INVENTION

The present invention contrives to solve the disadvantages of the prior art.

An objective of the invention is to provide a micromirror array lens with free surface.

Another objective of the invention is to provide a micromirror array lens with free surface that enables high performance of a large-aperture lens with compactness.

A micromirror array lens includes a plurality of micromirrors, and the micromirror array lens reproduces a predetermined free surface by controlling rotation and/or translation of the micromirrors.

The micromirrors are controlled by control circuitry. The micromirrors are upheld by a mechanical structure. The micromirrors include a reflective surface.

The predetermined free surface of the lens is changed by controlling rotation and/or translation of the micromirrors.

The predetermined free surface of the lens is fixed.

The rotational amount and direction of micromirror are determined by the gradient of the predetermined free surface.

The translation of each micromirror is controlled to satisfy the same phase condition.

All of the micromirrors are arranged on a flat plane.

The micromirrors are arranged in one or more concentric circles to form a lens, and include electrodes. The micromirrors on each the concentric circle are actuated by one or more electrodes corresponding to the concentric circle. The micromirrors with same translational and rotational displacements are actuated by the same electrodes.

The micromirror has a fan shape, a hexagonal shape, a rectangular shape, a square shape, or a triangle shape.

The reflective surface of the micromirror is substantially flat.

The control circuitry is constructed under the micromirrors by using semiconductor microelectronics technologies, and the control circuitry includes at least one wire layer.

The micromirrors are actuated by electrostatic force, electromagnetic force, or electrostatic force and electromagnetic force.

The mechanical structure upholding the micromirrors and actuating components are located under the micromirrors.

The micromirrors are controlled independently. The reflective surface of the micromirror has a curvature. The curvatures of the micromirrors are controlled. The curvatures of the micromirrors are controlled by electrothermal force and/or electrostatic force.

The reflective surface of the micromirror is made of material with high reflectivity. The reflective surface of the micromirror is made of metal. The metal includes silver, aluminum, platinum, or gold. The metal is protected by dielectric coating or multi-layered dielectric coating.

The reflective surface of the micromirror is made of metal compound. The metal compound is protected by dielectric coating or multi-layered dielectric coating. The reflective surface of the micromirror is made of multi-layered dielectric material.

The lens is a spatial light modulator. The lens is the spatial light modulator compensating for phase errors of light due to the medium between an object and its image. The spatial light modulator corrects aberrations. The spatial light modulator corrects deviation from the rules of paraxial imagery. The spatial light modulator makes an object which lies off the optical axis to be imaged without macroscopic mechanical movement.

The lens is controlled to satisfy the same phase condition for each wavelength of Red, Green, and Blue (RGB), respectively, to get a color image.

The lens is controlled to satisfy the same phase condition for one wavelength among many wavelengths to get a color image.

The same phase condition for color imaging is satisfied by using the least common multiple of wavelengths of Red, Green, and Blue lights as an effective wavelength for the phase condition.

The lens is positioned with a rotation about one axis in an optical system. For example, the lens is positioned with a rotation about the X-axis, which is perpendicular to the optical axis. If so, the surface profile is symmetric about the Y-axis, which is perpendicular to the optical axis and X-axis.

The lens is adapted for an imaging apparatus. The imaging apparatus has at least one function among optical zoom, digital zoom, automatic focusing, and three-dimensional imaging.

The imaging apparatus is the video monitoring camera. The video monitoring apparatus have at least one function among optical zoom, automatic focusing, three-dimensional imaging, and digital zoom.

The imaging apparatus is a camcorder. The camcorder has at least one function among optical zoom, automatic focusing, three-dimensional imaging, and digital zoom.

The imaging apparatus is embodied in a portable device. The imaging apparatus has at least one function among optical zoom, automatic focusing, three-dimensional imaging, and digital zoom.

The imaging apparatus is a cellular phone camera. The cellular phone camera has at least one function among optical zoom, automatic focusing, three-dimensional imaging, and digital zoom.

The imaging apparatus is embodied in television. The imaging apparatus embodied in television has at least one function among optical zoom, automatic focusing, three-dimensional imaging, and digital zoom.

The imaging apparatus is embodied in notebook computer. The imaging apparatus embodied in notebook computer has at least one function among optical zoom, automatic focusing, three-dimensional imaging, and digital zoom.

The imaging apparatus is embodied in a computer. The imaging apparatus embodied in computer has at least one function among optical zoom, automatic focusing, three-dimensional imaging, and digital zoom.

The imaging apparatus is embodied in a computer monitor. The imaging apparatus embodied in a computer monitor has at least one function among optical zoom, automatic focusing, three-dimensional imaging, and digital zoom.

The imaging apparatus is embodied in a portable digital assistant PDA). The imaging apparatus embodied in a PDA has at least one function among optical zoom, automatic focusing, three-dimensional imaging, and digital zoom.

The imaging apparatus is used for pattern recognition system. The pattern recognition system is embodied in a cellular phone.

The imaging apparatus is used for movement recognition system. The movement recognition system is embodied in a cellular phone.

The imaging apparatus is used for an endoscope.

The imaging apparatus is used for a three-dimensional display apparatus.

The lens is used for a two-dimensional projection display apparatus. The two-dimensional projection display apparatus is embodied in a portable apparatus. The portable apparatus is a cellular phone. The two-dimensional projection display apparatus projects a keyboard image.

The lens is used for a three-dimensional imaging apparatus. The three-dimensional imaging apparatus is used for three-dimensional pattern recognition system. The three-dimensional pattern recognition system is embodied in a cellular phone. The three-dimensional imaging apparatus is used for three-dimensional movement recognition system. The three-dimensional movement recognition system is embodied in a cellular phone. The three-dimensional movement recognition system is used for collision prevention system of car. The three-dimensional imaging apparatus is used for three-dimensional endoscope.

The lens is used for a bar-code reading apparatus.

The lens is used for an optical pick-up apparatus.

The lens is used for a beam focusing and scanning system. The beam focusing and scanning system is used for a printer. The beam focusing and scanning system is used for a scanner.

The lens is used for an optical tracking system. The optical tracking system is used for three-dimensional mouse.

The lens is used for a three-dimensional integral imaging and displaying system.

The lens is used for an imaging stabilizer apparatus.

This invention can be used for the imaging apparatus because MMAL (micromirror array lens) with free surface can reduce volume and weight of optical system and increase optical performance.

When the imaging apparatus is used for digital camera, the imaging apparatus has a function of a digital zoom. This invention can be used for the zoom system, three-dimensional imaging device, automatic focusing system, video monitoring camera, imaging stabilizer, three-dimensional display apparatus, two-dimensional image projection system, optical pick-up device, beam focusing and scanning system, optical tracking system, and three-dimensional integral imaging and display system as described in U.S. patent application Ser. No. 10/806,299 for "Small and Fast Zoom System" filed on Mar. 22, 2004, U.S. patent application Ser. No. 10/822,414 for "Three-Dimensional Imaging Device" filed on Apr. 12, 2004, U.S. patent application Ser. No. 10/896,141 for "High Speed Automatic Focusing System" filed on Jul. 21, 2004, U.S. patent application Ser. No. 11/076,688 for "Video Monitoring System using Variable Focal Length Lens" field on Mar. 10, 2005, U.S. patent application Ser. No. 10/979,612 for "Imaging Stabilizer using Micromirror Array Lens filed on Nov. 2, 2004, U.S. patent application Ser. No. 10/778,281 for "Three-Dimensional Display using Variable Focusing Lens", filed on Feb. 13, 2004, U.S. patent application Ser. No. 10/914,474 for "Two Dimensional Image Projection System" filed on Aug. 9, 2004, U.S. patent application Ser. No. 10/934,133 for "Optical Pick-up Device", filed on Sep. 3, 2004, U.S. patent application Ser. No. 10/979,568 for "Beam Focusing and Scanning System using Micromirror Array Lens" filed on Nov. 2, 2004, U.S. patent application Ser. No. 10/979,619 for "Optical Tracking System using Variable Focal Length Lens" filed on Nov. 2, 2004, and U.S. patent application Ser. No. 10/979,624 for "Three-Dimensional Integral Imaging and Display System using Variable Focal Length Lens" filed on Nov. 2, 2004.

If MMAL with free surface is applied for those applications, the invention has additional advantages such that volume and weight of the system can be reduced and high-optical performance is possible besides the advantages described in U.S. patent application Ser. Nos. 10/806,299, 10/822,414, 10/896,141, 11/076,688, 10/979,612, 10/778, 281, 10/914,474, 10/934,133, 10/979,568, 10/979,619, 10/979,624.

The imaging apparatus including MMAL with free surface can be used for pattern recognition and movement recognition system. The movement recognition system can be embodied in a cellular phone and the imaging apparatus can be used for an endoscope.

The three-dimensional imaging apparatus including MMAL with free surface can be used for three-dimensional pattern recognition system and three-dimensional movement recognition system. Especially, high optical performance, high speed, and small volume of the apparatus are most useful advantages for those applications. The three-dimensional movement recognition system can be embodied in a cellular phone and can be used for collision prevention system of car because of high optical performance, high speed, and small volume. Also, the three-dimensional imaging apparatus can be used for three-dimensional endoscope because of high optical performance, high speed, and small volume.

The imaging apparatus including MMAL with free surface can be embodied in a portable device, which can have at least one function among optical zoom, automatic focusing, three-dimensional imaging, and digital zoom.

The imaging apparatus including MMAL with free surface can be the video monitoring camera, a camcorder, a cellular phone camera, which can have at least one function among optical zoom, automatic focusing, three-dimensional imaging, and digital zoom. The video camera, camcorder can have advantages of optical zoom, automatic focusing, three-dimensional imaging, digital zoom, small volume, light weight, and high-performance. The imaging apparatus can be embodied in television, notebook computer, desktop computer, and computer monitor. The apparatus can have at least one function among optical zoom, automatic focusing, three-dimensional imaging, and digital zoom. Therefore, the apparatus can have advantages of optical zoom, automatic focusing, three-dimensional imaging, digital zoom, small volume, light weight, and high-performance.

The two-dimensional projection display apparatus including MMAL with free surface can be embodied in a portable apparatus. Their volume and weight can be reduced and high-optical performance is possible and the apparatus also has the advantages described in U.S. patent application Ser. No. 10/914,474. The two-dimensional projection display apparatus can be embodied in portable apparatus such as cellular phone and PDA because two-dimensional projection display apparatus has small volume, less weight, and low power consumption. Keyboard image can be projected on screen such as a desk and wall by the two-dimensional projection display apparatus including MMAL with free surface. Portable keyboard by projected image is necessary in portable apparatus such as cellular phone and PDA. Finger's motion detection also is necessary to develop the projected keyboard.

The beam focusing and scanning system including MMAL with free surface can be used for a printer, scanner. High speed focusing and scanning function of the MMAL can make the system to have high resolution printing and scanning.

The optical tracking system including MMAL with free surface can be used for three-dimensional mouse. The high speed 3D tracking function of MMAL with free surface can make 3D mouse possible.

The advantages of the present invention are: (1) the micromirror array lens with free surface enables high performance of a large-aperture lens; and (2) the micromirror array lens with free surface enables building of compact optical devices.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

The U.S. patent application Ser. Nos. 10/855,287, 10/857,714, 10/857,280, 10/983,353, 10/778,281, 10/806,299, 10/822,414, 10/896,141, 10/914,474, 10/934,133, 10/979,568, 10/979,619, 10/979,624, 10/979,612, 11/072,296, and 11/076,688 are incorporated by reference into this disclosure as if fully set forth herein.

Figure 1:
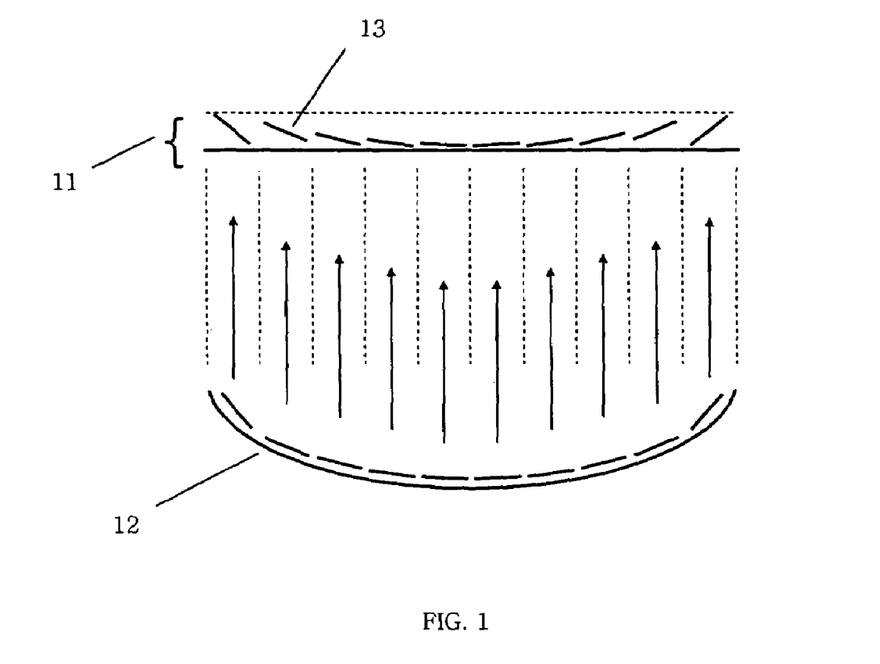
FIG. 1 illustrates the principle of the Fresnel lens and micromirror array lens.

FIG. 1 illustrates the principle of the Fresnel lens and micromirror array lens 11. There are two conditions to make a perfect lens. The first is the converging condition that all lights scattered by one point of an object should converge into one point of the image plane. The second is the same phase condition that all converging light should have the same phase at the image plane. To satisfy the perfect lens conditions, the surface shape of conventional reflective lens 12 is formed to have all lights scattered by one point of an objective to be converged into one point of the image plane and have the optical path length of all converging light to be same.

Figure 2:
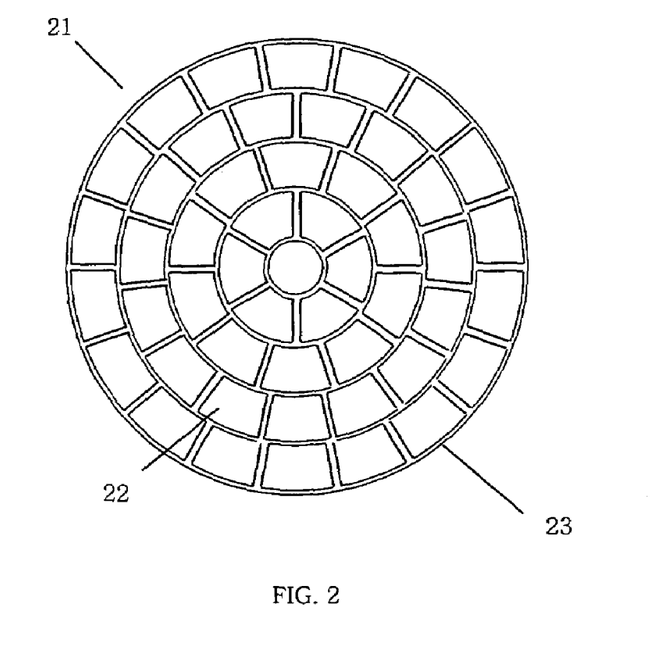
FIG. 2 illustrates the in-plane view of the axis-symmetric micromirror array lens.

FIG. 2 illustrates the in-plane view of the axis-symmetric micromirror array lens 21. The micromirror 22 has the same function as a mirror. Therefore, the reflective surface of the micromirror 22 is made of metal, metal compound, multi-layered dielectric material, or other materials with high reflectivity. Many known microfabrication processes can make the surface with high reflectivity. Each micromirror 22 is electrostatically and/or electromagnetically controlled by the actuating components 23 as known. In case of an axis-symmetric lens, the micromirror array lens 21 has a polar array of the micromirrors 22. Each of the micromirrors 22 has a fan shape to increase an effective reflective area, which increases optical efficiency. The micromirrors are arranged to form one or more concentric circles to form an axis-symmetric lens and the micromirrors on the same concentric circle can be actuated by the same electrodes or independently controlled by known semiconductor microelectronics technologies such as MOS or CMOS. The mechanical structure upholding each reflective micromirror 22 and the actuating components 23 are located under the micromirrors 22 to increase the effective reflective area. Electric control circuits to operate the micromirrors can be replaced with known semiconductor microelectronics technologies such as MOS and CMOS. Also, the control circuitry can be made by at least one wire layer as described in U.S. patent application Ser. No. 11/072,296.

Applying the microelectronics circuits under micromirror array, the effective reflective area can be increased by removing necessary area for electrode pads and wires used to supply actuating power.

Figure 3:
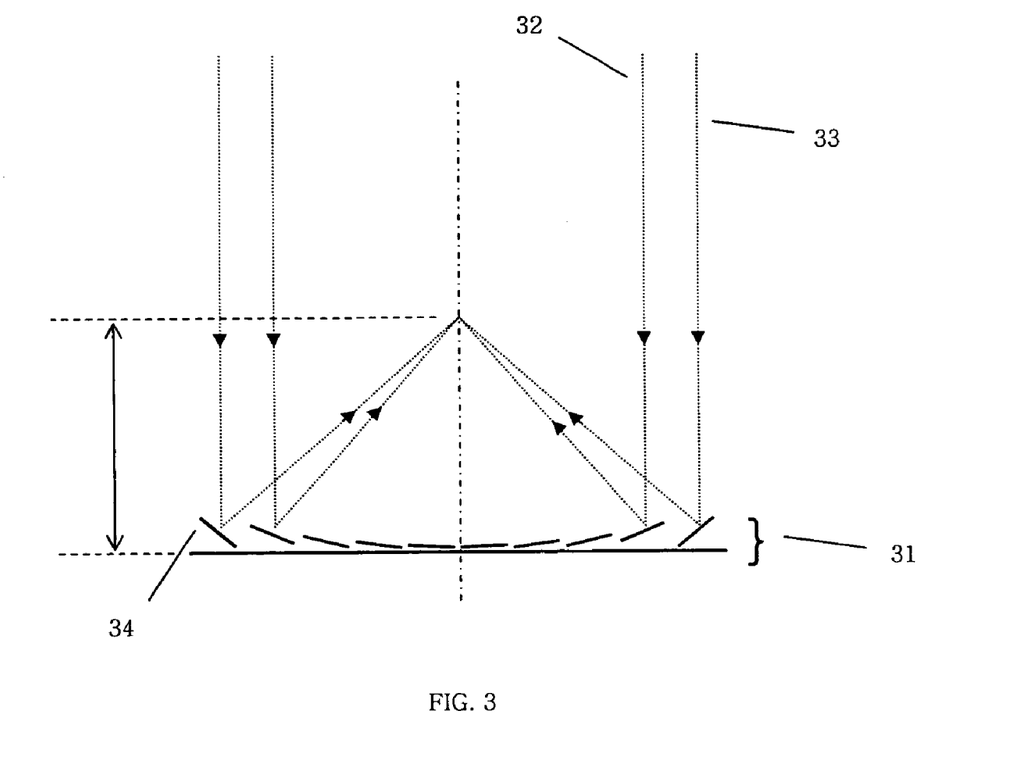
FIG. 3 illustrates how the micromirror array lens makes an image.

FIG. 3 illustrates how the micromirror array lens 31 makes an image. Arbitrary scattered lights 32, 33 are converged into one point P of the image plane by controlling the positions of the micromirrors 34. The phases of arbitrary light 32, 33 can be adjusted to be same by translating the micromirrors 34. The required translational displacement is at least half of the wavelength of light. It is desired that each micromirror 34 has a curvature because the ideal shape of a conventional reflective lens 12 has a curvature. If the size of the flat micromirror is small enough, the aberration of the lens including flat micromirrors 34 also becomes small enough. In this case, the micromirror does not need a curvature. The focal length f of the micromirror array lens 31 is changed by controlling the rotation and the translation of each micromirror 34.

Parallel ray with 0 degree of view angle (or scanning angle for the scanning device) is converged into one point by parabolic surface. By the way, practical optical system requires continuous view angle (or scanning angle) in field of view (or scanning range). Therefore, the required surface is not simple parabolic, which is usually polynomial function. The optimal surface for continuous field of view (or scanning angle) can be generally found by optical simulation software. As explained in FIG. 1, the optimal surface can be made by micromirror array using Fresnel lens principle.

In present, there is no optical software to find the optimal rotation and translation of each micromirror of MMAL. Therefore, the rotation and translation of each micromirror should be calculated from the optimal aspheric surface function found by optical simulation software.

Figure 4:
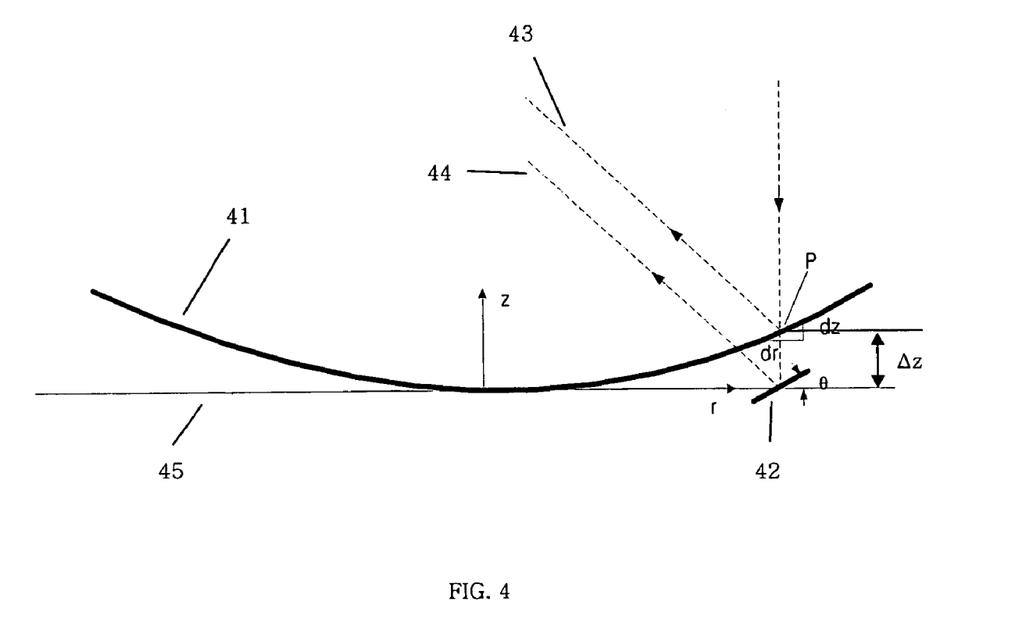
FIG. 4 shows a micromirror reproducing a part of the axis-symmetric reflective surface.

FIG. 4 shows a micromirror reproducing a part of the axis-symmetric reflective surface. The aspheric surface 41 can be expressed in $$z=f(r)$$

where z is profile of aspheric surface 41 and r is a radial component in cylindrical coordinate system.

Rotation of micromirror 42, θ is calculated from the gradient of z, dz/dr. Direction of ray 43 reflected by the aspheric surface 41 is same with the direction of ray 44 reflected by the micromirror because r-directional gradient of the aspheric surface at the point P is reproduced by rotation of micromirror 42.

If the aspheric surface is not axis-symmetric, it can be expressed in $$z=f(x,y)$$

where z is profile of aspheric surface and x and y is in-plane coordinate.

In this case, two degree-of-freedom rotation is necessary, which is x-directional and y-directional rotation.

$$\theta_x = \frac{\partial z}{\partial x}$$

$$\theta_y = \frac{\partial z}{\partial y}$$

Because micromirror 42 is fabricated by microfabrication process, they are arranged in a flat plane 45 as shown in FIG. 4. Therefore, the optical path length of ray reflected the aspheric surface is different with the one of ray reflected by the micromirror 42. The optical path length difference is caused by height difference, Δz between the aspheric surface and the micromirror, which is expressed in $$\Delta OPD = 2 \times \Delta z,$$

where OPD is optical path length.

Even though the OPD of converging light is different, the phase of two lights can be matched by adjusting the OPD to be m times wavelength because the phase of light is periodic, where m is an integer.

Figure 5:
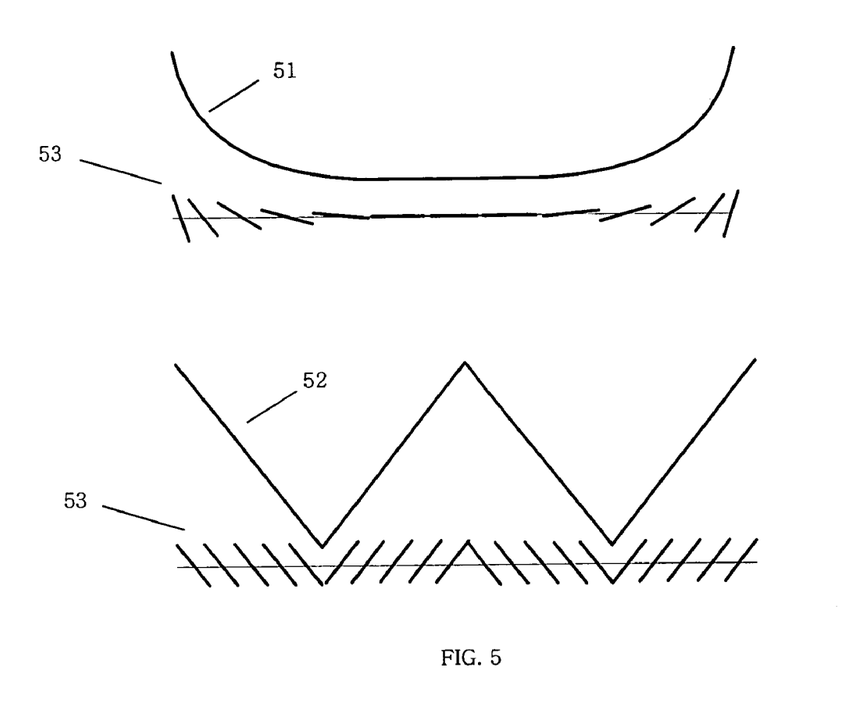
FIG. 5 shows two examples of aspheric surface, U shape and W shape.

FIG. 5 shows two examples of aspheric surface, U shape 51 and W shape 52. They can be reproduced by MMAL 53 as shown in FIG. 5.

Figure 6:
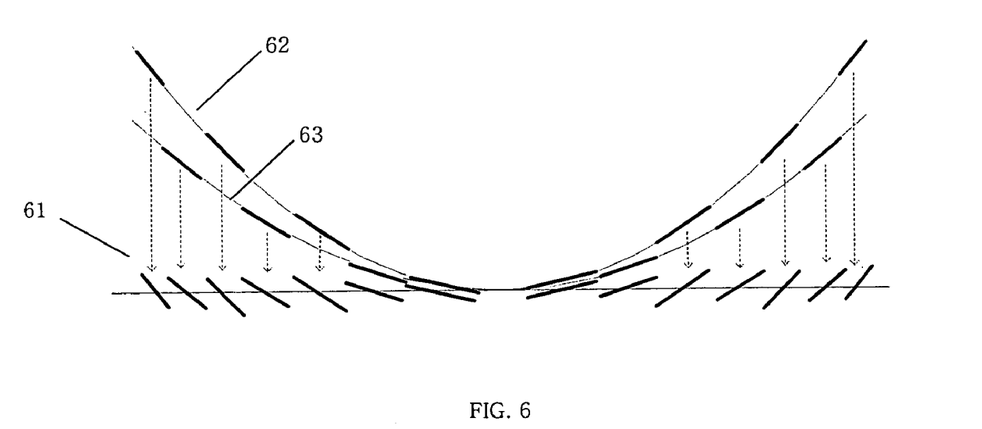
FIG. 6 shows dual focal length MMAL.

FIG. 6 shows dual focal length MMAL 61. Two aspheric surfaces 62, 63 with different focal length can be reproduced into one MMAL 61. Multiple focal length MMAL also possible in one MMAL.

Figure 7:
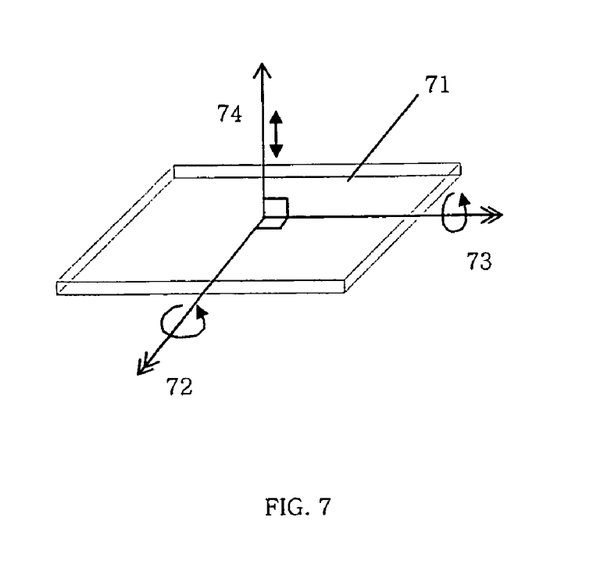
FIG. 7 shows two degree of freedom rotations and one degree of freedom translation of the micromirror.

FIG. 7 shows two degree of freedom rotations and one degree of freedom translation of the micromirror 71. The array including micromirrors 71 with two degree of freedom rotations 72, 73 and one degree of freedom translation 74, which are controlled independently can make a lens with arbitrary aspheric surface. Incident lights can be modulated arbitrarily by forming an arbitrary aspheric surface. To do this, it is required that incident lights are deflected to an arbitrary direction by controls of two degree of freedom rotations 72, 73. Independent translation 74 of each micromirror is also required to satisfy the phase condition.

Figure 8A:
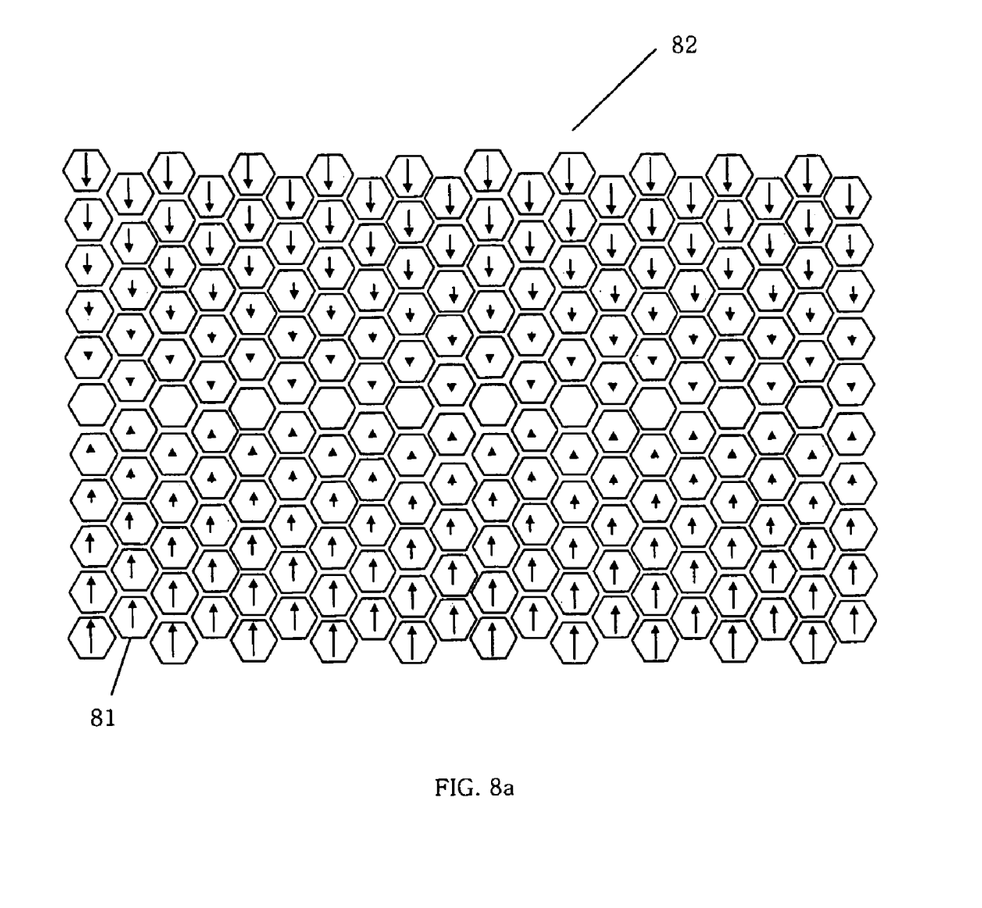
FIG. 8a shows a variable focal length cylindrical lens including hexagonal micromirrors.
Figure 8B:
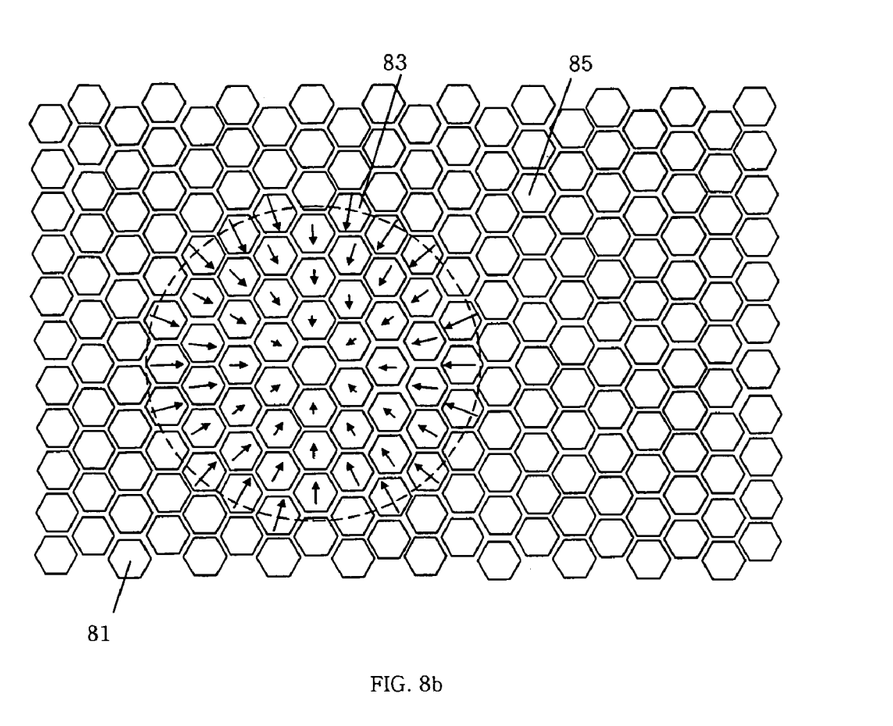
FIG. 8b shows a variable focal length circular lens including hexagonal micromirrors.
Figure 9:
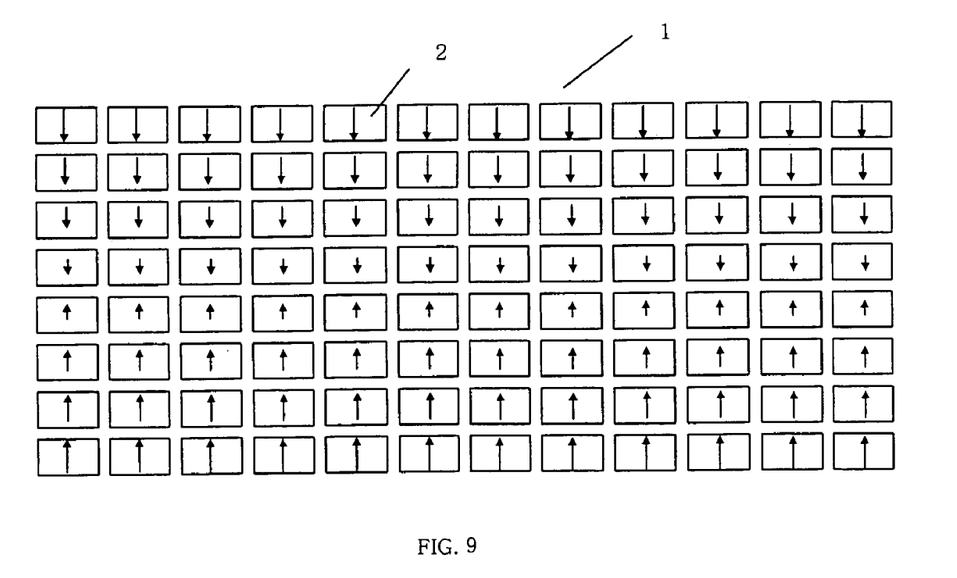
FIG. 9 shows a variable focal length cylindrical lens including rectangular micromirrors.
Figure 10:
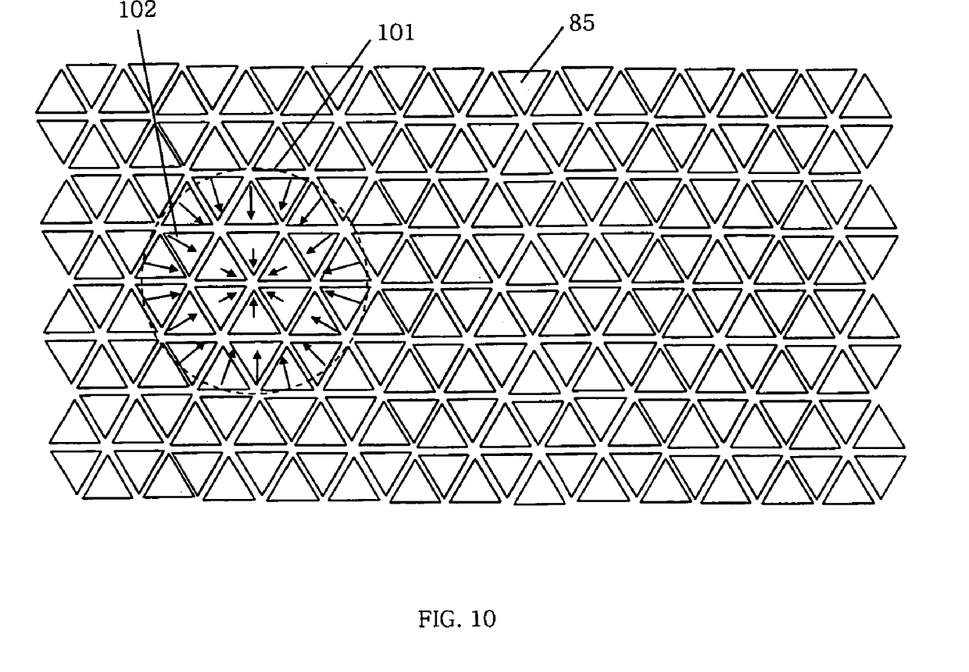
FIG. 10 shows a variable focal length circular lens including triangular micromirrors.

In FIGS. 8a, 8b, 9 and 10, the rotational amount and direction of a micromirror are represented by length of arrow 82 and the profile gradient direction to represent a rotational direction of a micromirror is represented by direction of arrow 82. FIG. 8a shows a variable focal length cylindrical lens including hexagonal micromirrors 81. FIG. 8b shows a variable focal length circular lens 83 including hexagonal micromirrors 81. Shape, position and size of the variable focal length circular lens 83 can be changed by independent control of micromirrors 81 with two DOF rotations and one DOF translation. In FIGS. 8b and 10, micromirrors 85 which are not elements of the lens are controlled to make lights reflected by the micromirrors 85 not have influence on imaging or focusing.

Even though FIGS. 8a–8b show hexagonal micromirrors 81, fan shape, rectangle, square, and triangle micromirrors array can be used. An array including fan shape micromirrors is appropriate to an axisymmetric lens. FIG. 9 shows a variable focal length cylindrical lens 91 including rectangular micromirrors 92. An array including square or rectangle micromirrors 92 is appropriate to a symmetric lens about one in-plane axis such as cylindrical lens 91. The micromirrors with same rotation are actuated by the same electrode or controlled by known semiconductor microelectronics technologies such as MOS or CMOS independently.

FIG. 10 shows a variable focal length circular lens 101 including triangular micromirrors 102. An array including triangular micromirrors 102 is appropriate to a lens with arbitrary shape and/or size lens like an array including hexagonal micromirrors.

The micromirror array lens is an adaptive optical component because the phase of light can be changed by controlling the translations 74 and rotations 72, 73 of micromirrors independently. Adaptive optical micromirror array lens requires two-dimensional arrays of individually addressable micromirrors. To achieve this, it is necessary to combine the micromirrors with on-chip electronics. In order to do this, wafer-level integration of micromirrors with the known microelectronics circuits is necessary.

The micromirror array lens can correct the phase errors since an adaptive optical component can correct the phase errors of light due to the medium between the object and its image, and/or correct the defects of a lens system that cause its image to deviate from the rules of paraxial imagery. For example, the micromirror array lens can correct the phase error due to optical tilt by adjusting the translations 74 and rotations 72, 73 of micromirrors.

The same phase condition satisfied by the micromirror array lens contains an assumption of monochromatic light. Therefore, to get a color image, the micromirror array lens is controlled to satisfy the same phase condition for each wavelength of Red, Green, and Blue (RGB), respectively, and the imaging system can use bandpass filters to make monochromatic lights with wavelengths of Red, Green, and Blue (RGB).

If a color photoelectric sensor is used as an imaging sensor in the imaging system using a micromirror array lens, a color image can be obtained by processing electrical signals from Red, Green, and Blue (RGB) imaging sensors with or without bandpass filters, which should be synchronized with the control of micromirror array lens. To image Red light scattered from an object, the micromirror array lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the micromirror array lens and each imaging sensor works in the same manner as the process for the Red light. Therefore, the micromirror array lens is synchronized with Red, Green, and Blue imaging sensors. Alternatively, the same phase condition for a color image is satisfied by using the least common multiple of wavelengths of Red, Green, and Blue lights as an effective wavelength for the phase condition. In this case, the micromirror array lens is not necessary to be controlled to satisfy the phase condition for each Red, Green, and Blue light individually. Instead, the phase condition for the least common multiple of the wavelengths should be satisfied.

For the simpler control, the translation of each micromirror is only controlled to satisfy the phase condition for one light among Red, Green, and Blue lights or is not controlled to satisfy the phase condition for any other lights of Red, Green, and Blue. Even though the micromirror array lens cannot satisfy the phase condition for multi-wavelength due to different phase error of lights, still the lens can be used as a variable focal length lens with low quality.

Figure 11:
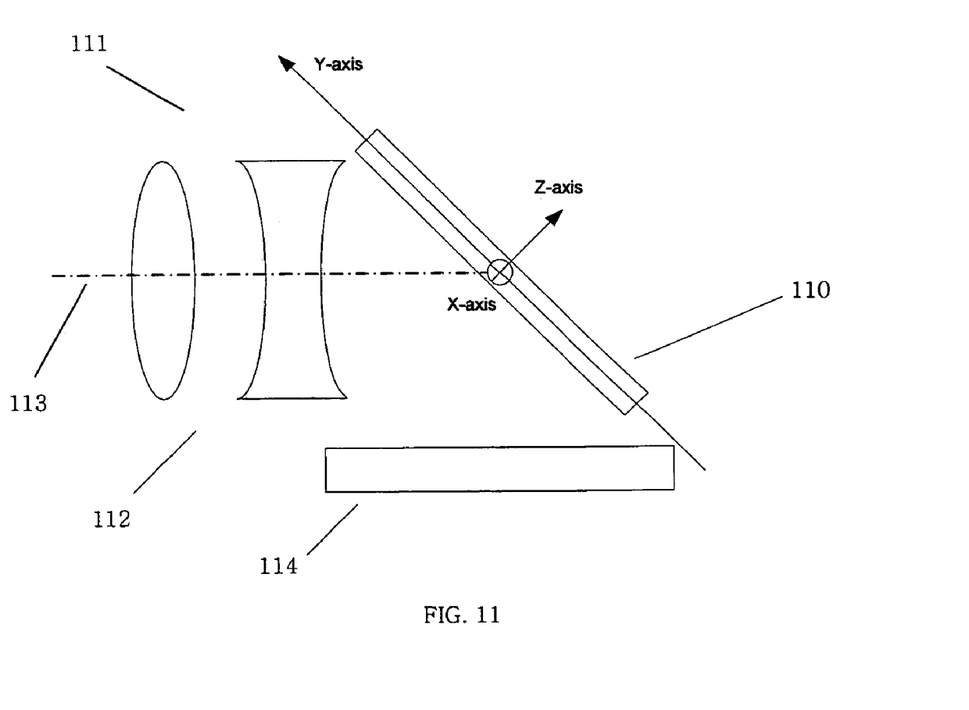
FIG. 11 shows imaging system using the MMAL with free surface.

FIG. 11 shows imaging system using the MMAL with free surface 110. The imaging system 111 is one example of optical system using the MMAL with free surface. Because the MMAL is reflective lens, the MMAL is usually positioned with tilt to deflect the light into a sensor 114 as shown in FIG. 11. Because conventional refractive lenses 112 are positioned to be perpendicular about optical axis 113, surface profile of the lens is generally axis-symmetric. But, the surface profile of the MMAL is only symmetric about Y-axis if the MMAL 110 is positioned with a rotation about X-axis.

The predetermined free surface includes an aspherical surface.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A micromirror array lens comprising a plurality of micromirrors, wherein the micromirror array lens reproduces a predetermined free surface by controlling two degrees of freedom rotation and one degree of freedom translation of the micromirrors.

2. The lens of claim 1, wherein the predetermined free surface of the lens is changed by controlling two degrees of freedom rotation and one degree of freedom translation of the micromirrors.

3. The lens of claim 1, wherein the predetermined free surface of the lens is fixed.

4. The lens of claim 1, wherein the rotational amount and direction of micromirror are determined by the gradient of the predetermined free surface.

5. The lens of claim 1, wherein the translation of each micromirror is controlled to satisfy the same phase condition.

6. The lens of claim 1, wherein all of the micromirrors are arranged on a flat plane.

7. The lens of claim 1, wherein the micromirrors are arranged in one or more concentric circles to form the lens, wherein the micromirror comprises one or more electrodes.

8. The lens of claim 7, wherein the micromirrors on each of the concentric circles are controlled by one or more electrodes corresponding to the concentric circle.

9. The lens of claim 1, wherein the micromirror comprises one or more electrodes, wherein the micromirrors are actuated by the electrodes.

10. The lens of claim 9, wherein the micromirrors with same translational and rotational displacements are actuated by the same electrodes.

11. The lens of claim 1, wherein the micromirror has a fan shape.

12. The lens of claim 1, wherein the micromirror have a hexagonal shape.

13. The lens of claim 1, wherein the micromirror has a rectangular shape.

14. The lens of claim 1, wherein the micromirror has a square shape.

15. The lens of claim 1, wherein the micromirror has a triangle shape.

16. The lens of claim 1, further comprising a control circuitry, wherein the micromirrors are controlled by the control circuitry.

17. The lens of claim 16, wherein the control circuitry is constructed under the micromirrors by using semiconductor microelectronics technologies.

18. The lens of claim 16, wherein the control circuitry is constructed under the micromirrors, wherein the control circuitry comprises at least one wire layer.

19. The lens of claim 1, wherein the micromirrors are actuated by electrostatic force.

20. The lens of claim 1, wherein the micromirrors are actuated by electromagnetic force.

21. The lens of claim 1, wherein the micromirrors are actuated by electrostatic force and electromagnetic force.

22. The lens of claim 1, further comprising a mechanical structure, wherein the micromirrors are upheld by the mechanical structure.

23. The lens of claim 22, wherein the mechanical structure upholding the micromirrors and actuating components are located under the micromirrors.

24. The lens of claim 1, wherein the micromirrors are controlled independently.

25. The lens of claim 1, wherein the micromirrors comprises a reflective surface.

26. The lens of claim 25, wherein the reflective surface of the micromirror is substantially flat.

27. The lens of claim 25, wherein the reflective surface of the micromirror has a curvature.

28. The lens of claim 27, wherein the curvatures of the micromirrors are controlled.

29. The lens of claim 27, wherein the curvatures of the micromirrors are controlled by electrothermal force.

30. The lens of claim 27, wherein the curvatures of the micromirrors are controlled by electrostatic force.

31. The lens of claim 25, wherein the reflective surface of the micromirror is made of material with high reflectivity.

32. The lens of claim 31, wherein the reflective surface of the micromirror is made of metal.

33. The lens of claim 32, wherein the metal comprises silver.

34. The lens of claim 32, wherein the metal comprises aluminum.

35. The lens of claim 32, wherein the metal comprises platinum.

36. The lens of claim 32, wherein the metal comprises gold.

37. The lens of claim 32, wherein the metal is protected by dielectric coating.

38. The lens of claim 32, wherein the metal is protected by multi-layered dielectric coating.

39. The lens of claim 25, wherein the reflective surface of the micromirror is made of metal compound.

40. The lens of claim 39, wherein the metal compound is protected by dielectric coating.

41. The lens of claim 39, wherein the metal is protected by multi-layered dielectric coating.

42. The lens of claim 25, wherein the reflective surface of the micromirror is made of multi-layered dielectric material.

43. The lens of claim 24, wherein the lens comprises a spatial light modulator for correcting the aberration, wherein the micromirrors are controlled independently.

44. The lens of claim 43, the spatial light modulator compensates for phase errors of light due to the medium between an object and its image.

45. The lens of claim 43, wherein the spatial light modulator corrects aberrations.

46. The lens of claim 43, the spatial light modulator corrects deviation from the rules of paraxial imagery.

47. The lens of claim 43, the spatial light modulator makes an object which lies off the optical axis to be imaged without macroscopic mechanical movement.

48. The lens of claim 1, wherein the lens is controlled to satisfy the same phase condition for each wavelength of many wavelength such as Red, Green, and Blue to get a color image.

49. The lens of claim 1, wherein the lens is controlled to satisfy the same phase condition for one wavelength among many wavelengths to get a color image.

50. The lens of claim 1, wherein the lens is controlled to satisfy the same phase condition for color imaging by using the least common multiple of wavelengths of many wavelengths such as Red, Green, and Blue lights as an effective wavelength for the phase condition.

51. The lens of claim 1, wherein the lens is positioned with a rotation about one axis in an optical system.

52. The lens of claim 51, wherein the surface profile of the lens is symmetric about the Y-axis.

53. The lens of claim 1, wherein the lens is adapted for an imaging apparatus.

54. The lens of claim 53, wherein the imaging apparatus has a function of the optical zoom.

55. The lens of claim 53, wherein the imaging apparatus has a function of a digital zoom.

56. The lens of claim 53, wherein the imaging apparatus has a function of the automatic focusing.

57. The lens of claim 53, wherein the imaging apparatus has a function of the three-dimensional imaging.

58. The lens of claim 53, wherein the imaging apparatus comprises the video monitoring camera.

59. The lens of claim 58, wherein the video monitoring apparatus has functions comprising optical zoom, automatic focusing, three-dimensional imaging, and digital zoom.

60. The lens of claim 53, wherein the imaging apparatus comprises a camcorder.

61. The lens 60, wherein the camcorder has functions comprising optical zoom, automatic focusing, three-dimensional imaging, and digital zoom.

62. The lens of claim 53, wherein the imaging apparatus is adapted for a portable device.

63. The lens of claim 62, wherein the imaging apparatus has functions comprising optical zoom, automatic focusing, three-dimensional imaging, and digital zoom.

64. The lens of claim 53, wherein the imaging apparatus comprises a cellular phone camera.

65. The lens of claim 64, wherein the cellular phone camera has functions comprising optical zoom, automatic focusing, three-dimensional imaging, and digital zoom.

66. The lens of claim 53, wherein the imaging apparatus is adapted for television.

67. The lens of claim 66, wherein the imaging apparatus embodied in television has functions comprising optical zoom, automatic focusing, three-dimensional imaging, and digital zoom.

68. The lens of claim 53, wherein the imaging apparatus is adapted for notebook computer.

69. The lens of claim 68, wherein the imaging apparatus embodied in notebook computer has functions comprising optical zoom, automatic focusing, three-dimensional imaging, and digital zoom.

70. The lens of claim 53, wherein the imaging apparatus is adapted for a computer.

71. The lens of claim 70, wherein the imaging apparatus embodied in computer has functions comprising optical zoom, automatic focusing, three-dimensional imaging, and digital zoom.

72. The lens of claim 53, wherein the imaging apparatus is adapted for a computer monitor.

73. The lens of claim 72, wherein the imaging apparatus embodied in a computer monitor has functions comprising optical zoom, automatic focusing, three-dimensional imaging, and digital zoom.

74. The lens of claim 53, wherein the imaging apparatus is adapted for a PDA.

75. The lens of claim 74, wherein the imaging apparatus embodied in a PDA has functions comprising optical zoom, automatic focusing, three-dimensional imaging, and digital zoom.

76. The lens of claim 53, wherein the imaging apparatus is adapted for a pattern recognition system.

77. The lens of claim 76, wherein the pattern recognition system is adapted for a cellular phone.

78. The lens of claim 53, wherein the imaging apparatus is adapted for a movement recognition system.

79. The lens of claim 78, wherein the movement recognition system is adapted for a cellular phone.

80. The lens of claim 53, wherein the imaging apparatus is adapted for an endoscope.

81. The lens of claim 1, wherein the lens is adapted for a three-dimensional display apparatus.

82. The lens of claim 1, wherein the lens is adapted for a two-dimensional projection display apparatus.

83. The lens of claim 82, wherein the two-dimensional projection display apparatus is adapted for a portable apparatus.

84. The lens of claim 83, wherein the portable apparatus comprises a cellular phone.

85. The lens of claim 82, wherein the two-dimensional projection display apparatus projects a keyboard image.

86. The lens of claim 1, wherein the lens is adapted for a three-dimensional imaging apparatus.

87. The lens of claim 86, wherein the three-dimensional imaging apparatus is adapted for a three-dimensional pattern recognition system.

88. The lens of claim 87, wherein the three-dimensional pattern recognition system is adapted for a cellular phone.

89. The lens of claim 85, wherein the three-dimensional imaging apparatus is adapted for a three-dimensional movement recognition system.

90. The lens of claim 89, wherein the three-dimensional movement recognition system is adapted for a cellular phone.

91. The lens of claim 89, wherein the three-dimensional movement recognition system is adapted for a collision prevention system of car.

92. The lens of claim 86, wherein the three-dimensional imaging apparatus is adapted for a three-dimensional endoscope.

93. The lens of claim 1, wherein the lens is adapted for a bar-code reading apparatus.

94. The lens of claim 1, wherein the lens is adapted for an optical pick-up apparatus.

95. The lens of claim 1, wherein the lens is adapted for a beam focusing and scanning system.

96. The lens of claim 95, wherein the beam focusing and scanning system is adapted for a printer.

97. The lens of claim 95, wherein the beam focusing and scanning system is adapted for a scanner.

98. The lens of claim 1, wherein the lens is adapted for an optical tracking system.

99. The lens of claim 98, wherein the optical tracking system is adapted for three-dimensional mouse.

100. The lens of claim 1, wherein the lens is adapted for a three-dimensional integral imaging and displaying system.

101. The lens of claim 1, wherein the lens is adapted for an imaging stabilizer apparatus.

* * * * *